United States Patent [19]

Zhukov et al.

[11] 4,426,457

[45] Jan. 17, 1984

[54] REFRACTORY POWDER AND METHOD OF PRODUCING SAME

[75] Inventors: Leonid F. Zhukov; Evgeny G. Chugunny, both of Kiev, U.S.S.R.

[73] Assignee: Institut Problem Litiya Akademii Nauk Ukrainskoi SSR, Kiev, U.S.S.R.

[21] Appl. No.: 361,902

[22] PCT Filed: Jul. 31, 1981

[86] PCT No.: PCT/SU80/00132

§ 371 Date: Mar. 18, 1982

§ 102(e) Date: Mar. 18, 1982

[87] PCT Pub. No.: WO82/00461

PCT Pub. Date: Feb. 18, 1982

[51] Int. Cl.$^3$ .............................................. C04B 35/10
[52] U.S. Cl. .................................. 501/128; 501/153; 501/154
[58] Field of Search ................. 501/128, 35, 153, 154

[56] References Cited

U.S. PATENT DOCUMENTS 4,251,279  2/1981  Ekdahl .............................. 501/153

FOREIGN PATENT DOCUMENTS 1424239  2/1976  United Kingdom ................. 501/35

Primary Examiner—James Poer
Attorney, Agent, or Firm—Lilling & Greenspan

[57] ABSTRACT

A refractory powder for use in a light guide assembly for transmitting a thermal radiation from a melt to a pyrometer through the lining of a metallurgical vessel.

The proposed powder has the following composition (by wt. %); aluminum oxide from 40 to 70, silicon dioxide from 29 to 59, and a sintering agent from 0.3 to 2.0. As the sintering agent use is made, in particular, of a boric acid.

According to the proposed method the aluminum oxide powder and the silicon dioxide powder are heated to a temperature of from 1200° to 1400° C. and from 900° to 1200° C. respectively, then cooled to a room temperature and mixed with simultaneously adding thereto a sintering agent until a uniform mixture is produced.

21 Claims, No Drawings

REFRACTORY POWDER AND METHOD OF PRODUCING SAME

TECHNICAL FIELD

The present invention relates to optical pyrometry applied in measuring the temperature of molten metals, and particularly to a composition of and a method for producing materials used for manufacturing a light guide assembly for transmitting thermal radiation from the molten metal to the pyrometer through the lining of a metallurgical vessel. More specifically, the invention is concerned with a refractory powder for use as a protective filler in a light guide assembly incorporating a corundum light-transmitting member, and a method of producing same.

BACKGROUND ART

To improve the operational reliability of light transmitting devices without making their construction more complex, is a problem still to be solved in the art of optical pyrometry.

The great number of patents granted in various countries (cf. USSR Authors' Certificates Nos 146,533 Int. Cl.$^2$ G OIK 1/00, 1961, and 271,067 Int. Cl$^2$ G 01/J 5/02, 1970, U.S. Pat. No. 3,745,834, FRG Pat. No. 2,338,532) indicates that the above problem still exists and that attempts have been made to solve it. Generally, the prior art light transmitting device comprises a light transmitting member made from a light-permeable corrosion-resistant refractory material such as for instance, quartz or synthetic corundum, and a tube wherein said light-transmitting member is disposed. The space between the inner surface of the tube and the light-transmitting member is filled with a refractory powder. When in use the device is mounted in the lining of a metallurgical vessel so that one end (exposed end) of the light-transmitting member is in contact with a melt, and the opposite end extends through the lining outside the vessel and is optically connected to a pyrometer.

Although a great many attempts have been made to improve the operational reliability of a light guide assembly, this has not yet occurred. This, perhaps, can be explained by the fact that in the prior art apparatus, only principal structural members of the light transmitting device were improved without changing the composition of the refractory powder. At the same time it is worth mentioning that the light guide assembly is operated under conditions of thermal shock (sharp changes in the temperature of the exposed end of the light-transmitting member) and high temperature gradients along the exposed end. Under such conditions the role of a refractory powder as protective means is increasing in importance. Therefore, with a decrease in the thickness of the lining and an increase in the temperature of the melt within the metallurgical vessel, stricter requirements are placed upon the protective refractory powder, since in this case the temperature gradient through the depth of the lining increases.

As a refractory powder, for instance, alkali-free heat resistant oxides are used (cf. Austria Pat. No. 280,650 Int. Cl$^2$ G 01K 1/16, Apr. 27, 1970). In particular zirconium dioxide ($ZrO_2$) and aluminum oxide ($Al_2O_3$) are most extensively used for this purpose. In the apparatus according to this patent, the powder is used in the same form as it is produced, that is, without preliminary treatment.

It is to be noted that the most efficient light-transmitting members at present are those made from synthetic (monocrystalline) corundum. However, in the course of operation of light guide assemblies having a corundum light-transmitting member and filled with a powder of any of the above two oxides, there arise a number of difficulties.

First, when in use, and in particular at the sintering temperature of the lining, the aluminum oxide powder tends to fuse with the corundum of the light-transmitting member, thereby preventing free displacement of the light-transmitting member within the refractory material, and thus increasing the probability of damage to it.

It should be noted in this connection that although the corundum light-transmitting member has the same chemical composition as the refractory powder, the former is a monocrystal while the latter is in the form of a polycrystal. As a result, they have different linear expansion coefficients, with the linear expansion coefficient of the refractory powder being higher than that of the light-transmitting member, which often results in damage to the latter, when heated, which is highly favored by the change of the temperature gradient across the thickness of the lining.

Furthermore, when sintered, the aluminum oxide powder features low plasticity, which also affects the durability of the light-transmitting member.

In addition, when sintered, this powder has a low thermal stability, which during the course of operation leads to cracks in the refractory mass and breaks off. As a result, the melt which is an aggressive medium gets on the lateral surface of the light-transmitting member, and may result in metal run out through the light guide assembly thereby rendering the metallurgical vessel inoperative and creating hazardous conditions for the attending personnel.

The second known refractory powder which is made from the zirconium dioxide also does not ensure reliable operation of a light guide assembly having a corundum light-transmitting member. Having the same disadvantages as the aluminum oxide e.g., low thermal stability and a linear expansion coefficient differing from that of the material of the light-transmitting member, it has a high sintering temperature so that it does not sinter during the melting operation, and in particular at the sintering temperature of the lining of the metallurgical vessel. Therefore, this powder has to be sintered before use, which complicates the manufacture of the light guide assembly as a whole. In addition, the sintered zirconium dioxide, when in use, does not provide tight contact with the lateral surface of the corundum light-transmitting member and the melt may penetrate through flaws and damage the light-transmitting member. Due to these disadvantages the above light guide assembly is not capable of providing a stable and reliable transmission of thermal radiation from the melt to the pyrometer, and hence a measurement accuracy when measuring the temperature of a melt.

DISCLOSURE OF INVENTION

It is an object of the invention to eliminate the above disadvantages.

The invention resides, therefore, in the provision of a refractory powder having a composition which prevents the destruction of a corundum light-transmitting member, and a method of producing such refractory powder.

The object of the invention is accomplished by use of a refractory powder comprising aluminum oxide, which according to the invention further includes silicon dioxide and a sintering agent, with said ingredients being in the following amounts, by wt.%:

aluminum oxide ($Al_2O_3$)—40–70
silicon dioxide ($SiO_2$)—29–59
sintering agent—0.3–2.0

This refractory powder which in addition to the aluminum oxide also contains silicon dioxide, has a lower linear expansion coefficient than the prior art refractory powder consisting solely of aluminum oxide, said coefficient being substantially the same as that of a light-transmitting member made from synthetic corundum, such as the leucosapphire. It is to be noted in this connection that the linear expansion coefficient of the leucosapphire in the temperature range from 1000° C. to 1500° C. is equal to $9 \cdot 10^{-6} K^{-1}$, while that of the refractory powder of the invention is $8.9 \cdot 10^{-6} K^{-1}$ in the same temperature range.

Furthermore, the presence of the silicon dioxide considerably enhances thermal stability of the refractory powder. With said amounts of the aluminum oxide and the silicon dioxide the melting point of the refractory compound lies in the temperature range from 1800° C. to 1850° C. During operation this refractory mass locally cools due to heat removal by radiation through the light-transmitting member and forms a layer of small thickness (up to 8 mm). The temperature sharply decreases through the thickness of the lining towards the outer surface of the lining and the proposed refractory powder can be used even at temperatures close to the melting temperature (up to 1750° C.).

The silicon dioxide prevents fusing of the refractory powder with the corundum light-transmitting member and improves its plasticity in the melting temperature range.

The presence of the sintering agent still further improves the plasticity of the refractory mass over a wider temperature range. The improvement in plasticity of the refractory mass is achieved due to the physicochemical interaction which takes place between the sintering agent and the rest of the ingredients producing chemical compositions or eutectics with low melting temperatures. In this case the sintering agent acts as a binder for the rest of the ingredients, favoring sintering of the powder into a viscous heat-resistant mass which tightly envelops the corundum light-transmitting member without fusing therewith. After being sintered, the refractory mass manifests high durability and resistance to the action of the melting products.

It should be noted that the sintering of the powder takes place only in the front portion of the light-transmitting member, while its greater portion is in a non-sintered (green) state, which increases the flexibility of the light-transmitting member. For instance, in induction crucibles having an acid rammed lining, this powder is sintered to a depth of up to 3 cm. The strength and depth of sintering of the powder can be controlled by varying the amount of the sintering agent.

The refractory mass thus formed permits the corundum light-transmitting member to freely move therein when the temperature gradient changes across the thickness of the lining or in the case of displacement thereof, and at the same time prevents the melt from penetrating the lateral surface of the light-transmitting member and leaking outside the vessel. It should be noted that the efficient operation of the light guide assembly can be ensured only when the recommended amounts of the ingredients in the powder mixture are observed.

If the aluminum oxide content exceeds 70%, while the silicon dioxide content is below 29% the difference between the linear expansion coefficient of the refractory powder and that of the corundum member sharply increase, approaching $10 \cdot 10^{-6} K^{-1}$, and the plasticity of the powder decreases (its softening point under the load of 2 kgs/sq.cm exceeds 1730° C.). The result is that the heat resistance of the powder decreases and it fuses with the material of the light-transmitting member. If the aluminum oxide content is below 40%, and the silicon dioxide content exceeds 59% the melting temperature of the powder decreases so that it may be below the melting temperature of the ferrous metals (which may be as high as 1750° C.), in which case the light-transmitting device incorporating such powder cannot be used in melting such metals. In addition, such powder has a linear expansion coefficient lower than the leucosapphire.

The best results are obtained when the aluminum oxide content is from 51 to 56 wt.% and the silicon dioxide content is from 42 to 47 wt.%. It has been established as a result of tests that the refractory powder mixture containing the above amounts of aluminum oxide and silicon dioxide provides for the most effective protection of the light-transmitting member. Moreover, this refractory compound exhibits protective properties in a wide temperature range (from 400° C. to 1750° C.), which makes it suitable for use in measuring melt temperatures of both ferrous and nonferrous metals.

The refractory powder may include various ingredients such as a sintering agent, for instance, boric acid ($H_3BO_3$) in an amount of 0.5 wt.% or boron oxide ($B_2O_3$) in an amount of 0.3–1.2 wt.%. It is well known that these materials have equivalent physicochemical characteristics, since the boric acid when being heated decomposes into boron oxide and water. The optimum compound is that which contains from 1 to 1.5 wt.% boric acid, and 0.6 to 0.8 wt.% boron oxide.

In this case at a temperature of 450° C. the boron oxide melts to form together with the silicon dioxide a binary eutectic, thereby enhancing to a great extent the plasticity of the refractory powder. At a temperature of 470° C. the boron oxide reacts with the aluminum oxide to form the compound $2Al_2O_3.B_2O_3$ having a low melting point, which further improves the plasticity of the refractory mass. With the temperature increase to 1035° C. the plasticity is provided by the formation of another compound with a low melting point, namely $9Al_2O_3.2B_2O_3$. Said low-melting compounds exist in the whole melting temperature range (up to 1750° C.). At a temperature of 1585° C. the aluminium oxide reacts with the silicon dioxide and depending on the ratio therebetween there is formed either kaolin ($Al_2O_3.2SiO_2$) or sillimanite ($Al_2O_3SiO_2$) which further improve the plasticity of the refractory compound. The refractory powder incorporating the boric acid (or the boron oxide) as a sintering agent is advantageous for use in the light-transmitting devices intended for measuring the temperature of the low-melting metals, such as, for instance, nonferrous metals, in which case the use of the boron oxide will be more advantageous as in this case the sintered powder has a lower porosity.

The proposed refractory powder may be otherwise differently composed. For example, it may include as a sintering agent orthophosphoric acid ($H_3PO_4$) in an amount of 0.4–1.6 wt.%, or phosphoric anhydride ($P_2O_5$) in an amount of 0.3–1.2 wt.%. The ortho-phosphoric acid is known to decompose at a temperature of 315° C.–350° C. into phosphoric anhydride and water. The optimum modification of the compound contains either 0.8–1.1 wt.% of ortho-phosphoric acid, or 0.6–0.8 wt.% of phosphoric anhydride.

When heated to a temperature of 260° C. (with the phosphoric anhydride used as a sintering agent), or to a temperature of 315° C. (in the case of the ortho-phosphoric acid) the former reacts with the silicon dioxide to form low-melting compounds $SiO_2 \cdot P_2O_5$ and $SiP_2O_7$ (their melting range is from 1120° to 1290° C.). These compounds contribute to the plasticity of the refractory powder. With the increase of the temperature (from 315° C. to 425° C.) the phosphoric anhydride begins to react with the aluminum oxide to form a further compound with a low melting point (1212° C.), namely, $AlPO_4$. At a temperature of 1585° C. the silicon dioxide, as mentioned above, reacts with the aluminum oxide to form kaolin or sillimanite. These compounds of the refractory powder are very suitable for use with high-melting metals, such as ferrous metals. It should be noted in this connection that the orthophosphoric acid is convenient for use in cases when the sintering of the refractory powder takes place simultaneously with the sintering of the lining, whereas the phosphoric anhydride is convenient to be used in cases when the refractory powder is preliminary sintered.

If in the proposed refractory powder the content of the boric acid, of the boron oxide, of the orthophosphoric anhydride, or of the phosphoric anhydride exceeds 2%, 1.2%, 1.6 and 1.2% respectively, the depth of the sintered mass considerably increases and that of the non-sintered refractory mass correspondingly decreases. This improves the resistance of the light guide assembly to heat and corrosion, but at the same time impairs the flexibility of said assembly, which eventually affects its operational reliability.

If the content of the ingredients is lower than 0.5%, 0.3%, 0.4%, 0.3% respectively, the refractory mass becomes too porous and its strength is not sufficient to adequately resist a detrimental effect of the melt.

These and other objects of the invention are also attained in a method for producing the proposed refractory powder, which comprises the steps of heating the aluminum oxide powder and the silicon dioxide powder to a temperature of from 1200° to 1400° C. and from 900° C. to 1200° C. respectively, cooling said powders to a room temperature, and mixing said powders while simultaneously adding thereto a sintering agent to produce a uniform mixture.

Such method makes it possible to produce a refractory powder with properties providing for reliable operation of the light guide assembly mounted in the lining of the metallurgical vessel. Heating the aluminum oxide and the silicon dioxide to said temperature is necessary for burning out impurities and driving off the moisture. Such preliminary heating is also required for imparting stable thermophysical properties to the powders.

Heating the aluminum oxide to a temperature below 1200° C. and the silicon dioxide powder to a temperature below 900° C. does not provide for complete removal of the impurities and the porosity of the refractory mass increases as a result. In addition, in this case, the aluminum oxide tends to sharply change its thermophysical properties, which results in the formation of cracks in the refractory mass.

At the same time, heating the aluminum oxide to a temperature above 1400° C. and the silicon oxide powder to a temperature higher than 1200° C. may cause separate sintering of these powders, which makes them difficult to mix together. Furthermore, being heated to such a temperature the silicon dioxide may be cuased to modify, which promotes the formation of cracks in the refractory mass during operation.

It is expedient that in carrying out the proposed method the rate of heating the aluminum oxide and silicon dioxide powders be from 7 to 10 K/min. Such rate of heating provides for the most efficient removal of impurities and lowering porosity of the refractory mass. The removal of impurities eliminates spontaneous blow-out of the refractory powder from the light guide assembly during sintering of this powder.

If the rate of heating is lower than 7 K/min the removal of impurities takes much more time, and hence more time is required for the manufacture of the light guide assembly. If this rate is higher than 10 K/min, then the spontaneous blow-out of the powder during heating occurs more frequently, and the removal of impurities proceeds inadequately.

It is also expedient to hold the aluminum oxide and the silicon dioxide powders at the required temperature for 1–2 hours. This will provide for a more effective removal of the impurities on the one hand, and fully eliminates the sintering of the powders during their calcination. Also, the aluminum oxide and the silicon dioxide acquires stable thermophysical properties, thereby preventing the formation of cracks in the refractory mass in the light guide assembly.

It is advisable that the aluminum oxide and the silicon dioxide be subjected to etching before heating followed by washing them with water, which will facilitate the removal of impurities, because as a result of the etching the impurities form compounds which can be removed from the powder either by washing with water or by heating.

It is also expedient that the solid ingredients of the proposed refractory powder (aluminum oxide, silicon dioxide, etc.) be preliminarily atomized to produce a powder with a particle size from 0.05 mm to 0.1 mm. This will facilitate sintering of the refractory powder and decrease the porosity of the sintered mass, and thereby decrease the depth of the metallization, which is very important for normal operation of the light guide assembly because within the metallized portion of the refractory material the coefficient of thermal expansion differs to a great extent from the mean coefficient of the rest of the refractory material. Further in the metallized portion there occurs fusing of the refractory material with the material of the corundum light-transmitting member, which increases the probability of its deterioration. The thermal conduction in said sintered portion is higher than that of the rest of the refractory material, and is close to the thermal conduction of the melt, which considerably lowers the permissible temperature gradients.

Decreasing the particle size of the solid ingredient below 0.05 mm leads to a higher probability of sintering the powders in the course of their calcination, and they are more difficult to catch and wash. In addition, they are difficult to compact which is inconvenient in the manufacture of the light guide assembly. With the larger particle size, the porosity of the refractory material, thereby causing the increase in the depth of the metallized portion.

In using ortho-phosphoric acid, in the proposed refractory powder, it is expedient to introduce this acid in the form of a 3–20% aqueous solution. The water present in the acid solution is sufficient for the refractory material to attain the required plasticity and to be more readily compacted. This also prevents the powder from running out of said light guide assembly while it is being mounted into the lining of a metallurgical vessel.

If the concentration of the ortho-phosphoric acid is higher than 20% the amount of water will be insufficient for adequate compaction of the refractory material. If the concentration is below 3% the refractory material will become too porous.

In producing the proposed refractory powder various polymorphic modifications and forms of the aluminum oxide and the silicon dioxide can be used as starting ingredients.

It is particularly expedient to use the aluminum oxide in the form of $\alpha$-$Al_2O_3$. Of all the polymorphic forms of aluminum oxide this form has the least tendency for hydration. Therefore the aluminum oxide powder used in this form has less cracks after sintering than the other forms. In addition, in this powder, these occur less spontaneous blow-outs during calcination. It features higher strength and heat resistance in a sintered state, and is capable of forming plastic compounds with the other ingredients, and is suitable for use throughout the temperature range of the refractory powder (from 400° C. to 1750° C.).

In has been established by tests that the best results in the working temperature range of the refractory powder are achieved using the quartz powder at a temperature not higher than 870° C., the tridymite powder, in the temperature range from 870° C. to 1470° C. and the crystobalite powder or siliceous glass at a temperature above 1470° C. These silicon dioxide modifications when used within said temperature ranges do not undergo for a long time any polymorphic transformations accompanied by sharp volumetric changes. Therefore, the volumetric change of each such modification, which takes place only with the temperature change and with a relatively small thermal expansion coefficient is not significant. This decreases the tendency of the sintered powder incorporated in the light guide assembly to cracking, thereby reducing the probability of rendering the device inoperable.

Below are given specific examples of producing the proposed powder and the results of testing thereof.

EXAMPLE 1

For the purpose of examining the properties of the proposed refractory powder there was manufactured a light guide assembly incorporating a corundum light-transmitting member, enclosed in a refractory tube filled with said powder, which powder contained the following ingredients (by wt, %):
aluminum oxide—54
silicon dioxide—45
boric acid—1

According to the invention the refractory powder was produced in the following way: the aluminum oxide and silicon dioxide powders were heated to the temperature of 1300° C. and 1100° C. respectively, whereafter they were cooled down to room temperature (20° C.) and then were mixed while subsequently adding the boric acid to provide a uniform mixture.

The light guide assembly thus manufactured was used for measuring the temperature of molten iron in the induction crucible (the working temperature range was from 1200° C. to 1600° C.). The refractory powder of said composition, when being sintered and then in the course of operation, did not fuse with the light-transmitting member, had tight contact therewith, and did not crack under temperature shocks, due to which the light-transmitting member was not damaged during the entire service life of the lining of the furnace. The thermophysical characteristics of the proposed refractory powder were examined from standard test pieces which were subjected to appropriate tests. The test results obtained are given below.

| | |
|---|---|
| softening point under the load of 2 kgs/sq. cm, °C. | 1450 |
| mean coefficient of linear expansion in the working temperature range, $\alpha \cdot 10^6$, $K^{-1}$ | 9.0 |
| heat resistance (number of thermal cycles) | from 70 to 80 |
| sintering temperature, °C. | from 1400 to 1500 |
| porosity, % | from 16 to 17 |
| melting temperature, °C. | 1860 |
| depth of the metallized layer, cm | from 0.7 to 0.8 |
| depth of sintering, cm | from 1.6 to 1.7. |

By the expression "standard thermal cycle" is meant a cycle comprising heating the test piece to a temperature of 860° C. and subsequently cooling the same in running water to a temperature of 25° C. By the expression "number of the standard thermal cycles" is meant the number of the thermal cycles after which the test piece loses 20% of its mass.

Under the same conditions there were also tested the prior art light guide assemblies and test pieces of the prior art refractory powder of known compositions: (1) $Al_2O_3$; (2) $ZrO_2$; (3) $ZrSiO_4$.

During operation refractory powder No 1 fused with the light-transmitting member and cracked under the thermal shocks, as a result of which the light-transmitting member was damaged long before the service life of the lining ran out. The thermophysical characteristics of this powder were lower than those of the proposed powder. The test results were as follows:

| | |
|---|---|
| softening temperature under the load of 2 kgs/sq. cm, °C. | 1850 |
| mean coefficient of the linear expansion in the working temperature range $\alpha \cdot 10^6$, $K^{-1}$ | 10.6 |
| sintering temperature, °C. | from 1750 to 1850 |
| thermal stability, | 3–4 |
| porosity, % | from 20 to 23 |
| melting temperature, °C. | from 2000 to 2030 |
| depth of the metallized layer, cm | from 3 to 4 |

Since the sintering temperature of prior art powder No. 1 exceeds the sintering temperature of an acid lining, it had to be preliminary sintered, which complicated the manufacture of the light guide assembly. It has been also established that the depth of sintering of prior powder 1 depends on the sintering conditions and not on the thermal conditions of the lining, which lowers the operational reliability of said unit. The powder mass 2 and the powder 3 showed during operation of the light guide assembly a strong tendency to cracking, broke off, and did not have tight contact with the light-transmitting member and the inner surface of the refractory tube of the light guide assembly. In addition, cases were observed wherein the melt penetrated to the lateral surface of the light-transmitting member with the result that said member was damaged.

EXAMPLE 2

Under the same testing conditions as in Example 1 there was tested a refractory powder having the following composition (in wt.%):

| aluminum oxide | 70 |
|---|---|
| silicon dioxide | 29.5 |
| boric acid | 0.5 |

During operation of the light guide assembly mounted in the lining of an induction furnace, the refractory powder showed the same properties as in Example 1.

The thermophysical characteristics of the test pieces produced from this refractory compound were as follows:

| softening temperature under the load of 2 kgs/sq. cm, °C. | 1500 |
|---|---|
| mean expansion coefficient in the working temperature range, $\alpha \cdot 10^6$, $K^{-1}$ | 10.0 |
| heat resistance | from 50 to 60 |
| sintering temperature, °C. | from 1400 to 1500 |
| porosity, % | from 18 to 20 |
| melting temperature, °C. | 1910 |
| depth of the metallized layer, cm | from 1.0 to 1.1 |
| depth of sintering, cm | from 1.0 to 1.2 |

EXAMPLE 3

Under the same testing conditions as in Example 1 there was tested a refractory powder of the invention, having the following composition (in wt.%):

| aluminum oxide | 69 |
|---|---|
| silicon dioxide | 29 |
| boric acid | 2 |

During operation of the light guide assembly mounted in the lining of an induction furnace, said refractory powder showed the same properties as Example 1.

The thermophysical characteristics of the test pieces made from this powder were as follows:

| softening temperature under the load of 2 kgs/sq. cm, °C. | 1480 |
|---|---|
| mean expansion coefficient in the working temperature range, $\alpha \cdot 10^6$, $K^{-1}$ | 10.0 |
| heat resistance | from 60 to 70 |
| sintering temperature, °C. | from 1400 to 1500 |
| porosity, % | from 16 to 18 |
| melting temperature, °C. | 1910 |
| depth of the metallized layer, cm | from 0.5 to 0.6 |
| depth of sintering | from 2.2 to 2.4 |

EXAMPLE 4

Under the same testing conditions as in Example 1, there was tested a refractory powder having the following composition, in wt.%:

| aluminum oxide | 40 |
|---|---|
| silicon dioxide | 59 |
| boric acid | 1.0 |

During operation of the light guide assembly mounted in the lining of an induction furnace, the refractory powder showed the same properties as in Example 1.

The thermophysical characteristics of the test pieces made from this powder were as follows:

| softening temperature under load of 2 kgs/sq. cm, °C. | 1400 |
|---|---|
| mean expansion coefficient in the working temperature range, $\alpha \cdot 10^6$, $K^{-1}$ | 8.0 |
| heat resistance | from 90 to 100 |
| sintering temperature, °C. | from 1400 to 1500 |
| porosity, % | from 13 to 15 |
| melting temperature, °C. | 1800 |
| depth of the metallized layer, cm | from 0.4 to 0.5 |
| depth of the sintering, cm | from 2.1 to 2.3 |

EXAMPLE 5

Under the same testing conditions as in Example 1 there was tested a refractory powder of the invention, having the following composition, in wt.%:

| aluminum oxide | 40.5 |
|---|---|
| silicon dioxide | 59 |
| boric acid | 0.5 |

During the operation of the light guide assembly mounted in the lining of an induction furnace, the proposed refractory powder showed the same properties as in Example 1.

The thermophysical characteristics of the test pieces made from the proposed powder were as follows:

| softening temperature under the load of 2 kgs per sq. cm, °C. | 1420 |
|---|---|
| mean coefficient of linear expansion in the working temperature range of melting, $\alpha \cdot 10^6$, $K^{-1}$ | 8.0 |
| heat resistance | from 90 to 100 |
| sintering temperature, °C. | from 1400 to 1500 |
| porosity, % | from 14 to 16 |
| melting temperature, °C. | 1800 |
| depth of the metallized layer, cm | from 0.9 to 1.0 |
| depth of sintering, cm | from 1.1 to 1.3 |

EXAMPLE 6

Under the same testing conditions as in Example 1 there was tested a refractory powder of the invention having the following composition, in wt.%:

| aluminum oxide | 65 |
|---|---|
| silicon dioxide | 34 |
| boric acid | 1.0 |

During the operation of the light guide assembly mounted in the lining of an induction furnace, the proposed refractory powder showed the same properties as in Example 1.

The thermophysical characteristics of the test pieces prepared from said powder were as follows:

| | |
|---|---|
| softening temperature under the load of 2 kg per sq. cm, °C. | 1480 |
| mean coefficient of linear expansion in the working temperature range of melting, $\alpha \cdot 10^6$, $K^{-1}$ | 9.7 |
| heat resistance | from 60 to 70 |
| sintering temperature, °C. | from 1400 to 1500 |
| porosity, % | from 18 to 20 |
| melting temperature, °C. | 1890 |
| depth of the metallized layer, cm | from 0.8 to 0.9 |
| depth of sintering, cm | from 1.3 to 1.5 |

EXAMPLE 7

Under the same testing conditions as in Example 1 there was tested a refractory powder of the invention, having the following composition, in wt.%:

| | |
|---|---|
| aluminum oxide | 60 |
| silicon dioxide | 39 |
| boric acid | 1 |

In the course of the operation of the light guide assembly mounted in the lining of an induction furnace, the proposed powder showed the same properties as in Example 1.

The thermophysical characteristics of the test pieces made from the proposed powder were as follows:

| | |
|---|---|
| softening temperature under the load of 2 kg per sq. cm, °C. | 1465 |
| mean coefficient of expansion in the working temperature range of melting, $\alpha \cdot 10^6$, $K^{-1}$ | 9.3 |
| heat resistance | from 65 to 75 |
| sintering temperature, °C. | from 1400 to 1500 |
| porosity, % | from 17 to 18 |
| melting temperature, °C. | 1875 |
| depth of the metallized layer, cm | from 0.7 to 0.8 |
| depth of sintering, cm | from 1.4 to 1.6 |

EXAMPLE 8

Under the same testing conditions as in Example 1 there was tested a refractory powder of the invention, having the following composition, in wt.%:

| | |
|---|---|
| aluminum oxide | 50 |
| silicon dioxide | 49 |
| boric acid | 1 |

During the operation of the light guide assembly mounted in the lining of an induction furnace, the proposed powder showed the same properties as in Example 1.

The thermophysical characteristics of the test pieces made from this powder were as follows:

| | |
|---|---|
| softening temperature under the load of 2 kg per sq. cm, °C. | 1435 |
| mean coefficient of linear expansion in the working temperature range of the melting operation, $\alpha \cdot 10^6$, $K^{-1}$ | 8.7 |
| heat resistance | from 80 to 90 |
| sintering temperature, °C. | from 1400 to 1500 |
| porosity, % | 15 to 16 |
| melting temperature, °C. | 1840 |
| depth of the metallized layer, cm | from 0.5 to 0.6 |
| depth of sintering, cm | from 1.7 to 1.9 |

EXAMPLE 9

A refractory powder containing, in wgt.%:

| | |
|---|---|
| aluminum oxide | 45 |
| silicon dioxide | 54 |
| boric acid | 1 | was tested under the same conditions as in Example 1.

In the course of operation of the light guide assembly mounted in the lining of an induction furnace, the proposed refractory powder exhibited the same properties as in Example 1.

The thermophysical characteristics of the test pieces made from said powder were as follows:

| | |
|---|---|
| softening point under the load of 2 kg per sq. cm, °C. | 1420 |
| mean coefficient of linear expansion in the working temperature range of melting operation, $\alpha \cdot 10^6$, $K^{-1}$ | 8.3 |
| heat resistance | from 85 to 95 |
| sintering temperature, °C. | from 1400 to 1500 |
| porosity, % | from 14 to 16 |
| melting point, °C. | 1820 |
| depth of the metallized layer, cm | from 0.4 to 0.5 |

EXAMPLE 10 (NEGATIVE)

Under the same testing conditions as in Example 1 there was tested a refractory powder of the following composition (in wt.%)

| | |
|---|---|
| aluminum oxide | 10 |
| silicon dioxide | 89 |
| boric acid | 1 |

During the operation of the light guide assembly mounted in the lining of a furnace, said powder showed a low heat resistance and its thermal expansion coefficient was much different from that of the light-transmitting member. This resulted in the melt penetrating to the lateral surface of said member, due to which the latter was destroyed long before the service life of the lining ran out.

EXAMPLE 11 (NEGATIVE)

Under the same conditions as in Example 1 there was tested a refractory powder of the following composition (in wt.%):

| | |
|---|---|
| aluminum oxide | 90 |

| silicon dioxide | 9 |
| boric acid | 1 |

During the operation of the light guide assembly mounted in the lining of a furnace, said refractory powder had insufficient heat resistance, did not have tight contact with the light-transmitting member, and fused therewith. It had a thermal expansion coefficient much exceeding the thermal expansion coefficient of the light-transmitting member, as a result of which there appeared cracks in the sintered powder, letting the melt penetrate deep into the light guide assembly, whereby the light-transmitting member was damaged long before the service life of the lining ran out.

EXAMPLE 12 (NEGATIVE)

Under the same testing conditions as in Example 1 there was tested a refractory powder having the following composition (in wt.%):

| aluminum oxide | 53 |
| silicon dioxide | 43 |
| boric acid | 4 |

During the operation of the light guide assembly mounted in the lining of a furnace, said refractory powder sintered to a considerable depth which exceeded the sintering depth of the lining. As a result, the sintered powder mass cracked thereby letting the melt penetrate to the lateral surface of the light-transmitting member and damage the latter.

EXAMPLE 13 (NEGATIVE)

Under the same testing conditions as in Example 1 there was tested a refractory powder having the following composition (in wt.%):

| aluminum oxide | 54 |
| silicon dioxide | 45.7 |
| boric acid | 0.3 |

During the operation of the light guide assembly mounted in the lining of a furnace, this refractory powder sintered to a small depth, and had insufficient strength due to which the sintered powder material was destroyed and washed out by the melt, whereby the light-transmitting member was rendered inoperative.

EXAMPLE 14

A refractory powder containing (by wt.%)

| aluminum oxide | 70 |
| silicon dioxide | 29.6 |
| orthophosphoric acid | 0.4 | was tested under the same testing conditions as in Example 1.

In the course of operation of the light guide assembly mounted in the lining of an induction furnace, the proposed powder exhibited the same properties as in Example 1.

The thermophysical characteristics of the test pieces made from said refractory powder were as follows:

| softening point under the load of 2 kg per sq. cm, °C. | 1500 |
| mean coefficient of linear expansion in the working temperature range of melting operation, $\alpha \cdot 10^6$, $K^{-1}$ | 10.0 |
| heat resistance | from 50 to 60 |
| sintering temperature, °C. | from 1400 to 1500 |
| porosity, % | from 18 to 20 |
| melting point, °C. | 1910 |
| depth of the metallized layer, cm | from 1.0 to 1.2 |
| depth of sintering | from 1.0 to 1.2 |

EXAMPLE 15

A refractory powder containing (in wt. %):

| aluminum oxide | 70 |
| silicon dioxide | 29.6 |
| orthophosphoric acid | 0.4 | was tested under the same testing conditions as in Example 1.

In the course of operation of the light guide assembly mounted in the lining of an induction furnace, the proposed powder exhibited the same properties as that described in Example 1.

The thermophysical characteristics of the test pieces made from said powder were as follows:

| softening point under the load of 2 kg per sq. cm, °C. | 1420 |
| mean coefficient of linear expansion in the working temperature range of the melting operation, $\alpha \cdot 10^6$, $K^{-1}$ | 8.0 |
| heat resistance | from 90 to 100 |
| sintering temperature, °C. | from 1400 to 1500 |
| porosity, % | from 14 to 16 |
| melting point, °C. | 1800 |
| depth of the metallized layer, cm | from 0.9 to 1.0 |
| depth of sintering, cm | from 1.0 to 1.2 |

EXAMPLE 16

A refractory powder containing (in wt. %)

| aluminum oxide | 40 |
| silicon dioxide | 59 |
| orthophosphoric acid | 1 | was tested under the same testing conditions as Example 1.

In the course of operation of the light guide assembly mounted in the lining of an induction furnace, the proposed refractory powder exhibited the same properties as that described in Example 1.

The Thermophysical characteristics of the test pieces made from said powder were as follows:

| softening point under the load of 2 kg per sq. cm, °C. | 1400 |
| mean coefficient of linear expansion in the working temperature range of melting operation, $\alpha \cdot 10^{-6}$, $K^{-1}$ | 8.0 |

-continued

| | |
|---|---|
| heat resistance | from 90 to 100 |
| sintering temperature, °C. | from 1400 to 1500 |
| porosity, % | from 13 to 15 |
| melting point, °C. | 1800 |
| depth of metallized layer, cm | from 0.4 to 0.5 |
| depth of sintering, cm | from 2.1 to 2.3 |

EXAMPLE 17

A refractory powder containing (in wt.%)

| | |
|---|---|
| aluminum oxide | 69.4 |
| silicon dioxide | 29 |
| orthophosphoric acid | 1.6 | was tested under the same conditions as in Example 1.

In the course of operation of the light guide assembly mounted in the lining of an induction furnace the proposed refractory powder exhibited the same properties as that described in an Example 1.

The thermophysical characteristic of the test pieces made from said refractory powder were as follows:

| | |
|---|---|
| softening point under the load of 2 kg per sq. cm, °C. | 1480 |
| mean coefficient of linear expansion in the working temperature range of the melting operation, $10^6$, $K^{-1}$ | 10.0 |
| heat resistance | from 60 to 70 |
| sintering temperature, °C. | from 1400 to 1500 |
| porosity, % | from 16 to 18 |
| melting point, °C. | 1910 |
| depth of the metallized layer, cm | from 0.5 to 0.6 |
| depth of sintering, cm | from 2.2 to 2.4 |

EXAMPLE 18

A refractory powder containing (in wt.%)

| | |
|---|---|
| aluminum oxide | 65 |
| silicon dioxide | 34 |
| orthophosphoric acid | 1 | was tested under the same conditions as in Example 1.

In the course of operation of the light guide assembly mounted in the lining of an induction furnace, the proposed powder exhibited the same properties as that described in Example 1.

The thermophysical characteristics of the test pieces made from said powder were as follows:

| | |
|---|---|
| softening point under the load of 2 kg per sq. cm, °C. | 1480 |
| mean coefficient of linear expansion in the working temperature range of melting operation, $\alpha \cdot 10^6$, $K^{-1}$ | 9.7 |
| heat resistance | from 60 to 70 |
| sintering temperature, °C. | from 1400 to 1500 |
| porosity, % | from 18 to 20 |
| melting point, °C. | 1890 |
| depth of the metallized layer, cm | from 0.8 to 0.9 |
| depth of sintering, cm | from 1.3 to 1.5 |

EXAMPLE 19

A refractory powder containing (by wt.%)

| | |
|---|---|
| aluminum oxide | 60 |
| silicon dioxide | 39 |
| orthophosphoric acid | 1 | was tested under the same conditions as in Example 1.

In the course of operation of the light guide assembly mounted in the lining of an induction furnace, the proposed refractory powder exhibited the same properties as that described in Example 1.

The thermophysical characteristics of the test pieces made from said powder were as follows:

| | |
|---|---|
| softening point under the load of 2 kg per sq. cm, °C. | 1465 |
| mean coefficient of linear expansion in the working temperature range of the melting operation, $\alpha \cdot 10^6$, $K^{-1}$ | 9.3 |
| heat resistance | from 65 to 75 |
| sintering temperature, °C. | from 1400 to 1500 |
| porosity, % | from 17 to 18 |
| melting point, °C. | 1875 |
| depth of the metallized layer, cm | from 0.7 to 0.8 |
| depth of sintering, cm | from 1.4 to 1.6 |

EXAMPLE 20

A refractory powder containing (in wt.%)

| | |
|---|---|
| aluminum oxide | 54 |
| silicon dioxide | 45 |
| orthophosphoric acid | 1 | was tested under the same conditions as in Example 1.

In the course of operation of the light guide assembly mounted in the lining of an induction furnace the proposed refractory powder exhibited the same properties as that described in Example 1.

The thermophysical characteristics of the test pieces made from said powder were as follows:

| | |
|---|---|
| softening point under the load of 2 kg per sq. cm, °C. | 1450 |
| mean linear expansion coefficient in the working temperature range of the melting operation, $\alpha \cdot 10^6$, $K^{-1}$ | 9.0 |
| heat resistance | from 70 to 80 |
| sintering temperature, °C. | from 1400 to 1500 |
| porosity, % | from 16 to 17 |
| melting point, °C. | 1860 |
| depth of the metallized layer, cm | from 0.7 to 0.8 |
| depth of sintering, cm | from 1.6 to 1.7 |

EXAMPLE 21

A refractory powder containing (in wt.%)

| | |
|---|---|
| aluminum oxide | 50 |
| silicon dioxide | 49 |

| | |
|---|---|
| -continued | |
| orthophosphoric acid | 1 |

In the course of operation of the light guide assembly mounted in the lining of an induction furnace, the proposed refractory powder showed the same properties as that described in Example 1.

The thermophysical characteristics of the test pieces made from said powder were as follows:

| | |
|---|---|
| softening point under the load of 2 kg per sq. cm, °C. | 1435 |
| mean linear expansion coefficient in the working temperature range of the melting operation, $\alpha \cdot 10^6$, $K^{-1}$ | 8.7 |
| heat resistance | from 80 to 90 |
| sintering temperature, °C. | from 1400 to 1500 |
| porosity, % | from 15 to 16 |
| melting point, °C. | 1840 |
| depth of the metallized layer, cm | from 0.6 to 0.7 |
| depth of sintering, cm | from 1.7 to 1.9 |

EXAMPLE 22

A refractory powder containing (in wt. %)

| | |
|---|---|
| aluminum oxide | 45 |
| silicon dioxide | 54 |
| orthophosphoric acid | 1 | was tested under the same conditions as in Example 1.

In the course of operation of the light guide assembly mounted in the lining of an induction furnace, the proposed refractory powder showed the same properties as that described in Example 1.

The thermophysical characteristics of the test pieces made from said powder were as follows:

| | |
|---|---|
| softening point under the load of 2 kg per sq. cm, °C. | 1420 |
| mean linear expansion coefficient in the working temperature range of the melting operation, $\alpha \cdot 10^6$, $K^{-1}$ | 8.3 |
| heat resistance | from 85 to 95 |
| sintering temperature, °C. | from 1400 to 1500 |
| porosity, % | from 14 to 16 |
| melting point, °C. | 1220 |
| depth of the metallized layer, cm | from 0.4 to 0.5 |
| depth of sintering, cm | from 1.9 to 2.1 |

EXAMPLE 23 (NEGATIVE)

Under the same conditions as in Example 1 there was tested a refractory powder of the following composition (in wt.%)

| | |
|---|---|
| aluminum oxide | 10 |
| silicon dioxide | 89 |
| orthophosphoric acid | 1 |

In the course of operation of the light guide assembly mounted in the lining of a furnace said powder exhibited a low heat resistance, and its thermal expansion coefficient differed much from that of the light-transitting member. As a result, the melt penetrated to the lateral surface of the light-transmitting member, due to which the latter was damaged long before the lining service life ran out.

EXAMPLE 24 (NEGATIVE)

Under the same conditions as in Example 1 there was tested a refractory powder having the following composition (in wt.%)

| | |
|---|---|
| aluminum oxide | 90 |
| silicon dioxide | 9 |
| orthophosphoric acid | 1 |

In the course of operation of the light guide assembly mounted in the lining of a furnace, said powder exhibited insufficient heat resistance and did not provide tight contact with the tube of the light-transmitting device. In addition, it fused with the material of the light-transmitting member and its thermal expansion coefficient exceeded to a great extent the thermal expansion coefficient thereof. This led to cracking of the sintered powder mass and ingress of the melt into the light-transmitting device, as a result of which the light-transmitting member was damaged long before the service life of the lining ran out.

EXAMPLE 25 (NEGATIVE)

Under the same conditions as in Example 1 there was tested a refractory powder having the following composition (in wt.%)

| | |
|---|---|
| aluminum oxide | 53 |
| silicon dioxide | 43 |
| orthophosphoric acid | 4 |

In the course of operation of the light guide assembly mounted in the lining of a furnace, said powder sintered to a considerable depth exceeding the depth of sintering of the lining, which led to cracking of the sintered powder mass and ingress of the melt onto the lateral surface of the light-transmitting member, thereby causing the destruction thereof.

EXAMPLE 26 (NEGATIVE)

Under the same conditions as in Example 1 there was tested a refractory powder having the following composition (in wt.%):

| | |
|---|---|
| aluminum oxide | 54.8 |
| silicon dioxide | 45 |
| orthophosphoric acid | 0.2 |

During operation of the light guide assembly mounted in the lining of a furnace said refractory powder sintered to a small depth and had insufficient durability, which led to the fracture of the sintered powder mass and washing-out thereof by the melt and thus to the destruction of the light-transmitting member.

EXAMPLE 27

Under the same testing conditions there was tested a refractory powder having the following composition (in wt.%):

| | |
|---|---|
| aluminum oxide | 54.3 |
| silicon dioxide | 45 |
| boron oxide | 0.7 |

In the course of operation of the light guide assembly mounted in the lining of an induction furnace, the proposed refractory powder showed the same properties as in Example 1.

The thermophysical characteristics of the test pieces prepared from this powder were, in general, similar to those obtained in Example 1. The porosity of the sintered powder material was lower and constituted 14–16%. The depth of the metallized layer decreased to 1.1–1.2 cm.

EXAMPLE 28

Under the same testing conditions there was tested a refractory powder having the following composition (in wt.%):

| | |
|---|---|
| aluminum oxide | 70 |
| silicon dioxide | 29.7 |
| boron oxide | 0.3 |

In the course of operation of the light guide assembly mounted in the lining of an induction furnace, the proposed refractory powder showed the same properties as in Example 1.

The thermophysical characteristics of the test pieces made of said powder were, in general, the same as in Example 2. The porosity of the sintered powder was 16–18%. The depth of the metallized layer decreased to 1.3–1.5 cm.

EXAMPLE 29

There was tested a refractory powder having the following composition (in wt.%).

| | |
|---|---|
| aluminum oxide | 70 |
| silicon dioxide | 29 |
| boron oxide | 1 |

The testing conditions were the same as in Example 1.

During the operation of the light guide assembly mounted in the lining of an induction furnace, the proposed refractory powder showed the same propperties as in Example 1.

The thermophysical characteristics of the test pieces made of said powder, were in general, similar to those obtained in Example 1. The porosity was lower and constituted 14–16%. The depth of the metallized layer decreased to 1.2–1.3 cm.

EXAMPLE 30

There was tested a refractory powder having the following composition (in wt.%):

| | |
|---|---|
| aluminum oxide | 40 |
| silicon dioxide | 58.8 |
| boron oxide | 1.2 |

The testing conditions were the same as in Example 1.

During the operation of the light guide assembly mounted in the lining of an induction furnace, the proposed refractory powder showed the same properties as in Example 1.

The thermophysical characteristics of the test pieces made of said powder were, in general, similar to those obtained in Example 4. The porosity of the sintered powder was lower and constituted 11–13%. The depth of the metallized layer decreased to 0.8–1.0 cm.

EXAMPLE 31

Under the same conditions as in Example 1 there was tested a refractory powder having the following composition (in wt.%):

| | |
|---|---|
| aluminum oxide | 54.3 |
| silicon oxide | 45 |
| phosphoric anhydride | 0.7 |

During operation of the light guide assembly mounted in the lining of an induction furnace, the proposed refractory powder exhibited the same properties as that described in Example 1.

The thermophysical characteristics of the test pieces made from said powder were generally similar to those described in Example 20; the porosity of the sintered powder mass was lower and constitute 12–14%. The depth of the metallized layer was from 0.8 to 1.0 cm.

EXAMPLE 32

Under the same conditions as in Example 1 there was tested a refractory powder having the following composition (in wt.%).

| | |
|---|---|
| aluminum oxide | 70 |
| silicon dioxide | 29.7 |
| phosphoric anhydride | 0.3 |

During operation of the light guide assembly mounted in the lining of an induction furnace, the proposed refractory powder exhibited the same properties as that described in Example 1.

The thermophysical characteristics of the test pieces made from said powder were in general similar to those described in Example 14. The porosity of the sintered powder mass was lower and constituted 16–20%. The depth of the metallized layer decreased to 1.6–1.8.

EXAMPLE 33

Under the same conditions as in Example 1 there was tested a refractory powder having the following composition (in wt.%):

| | |
|---|---|
| aluminum oxide | 69.8 |
| silicon dioxide | 29 |
| phosphoric anhydride | 1.2 |

During operation of the light guide assembly mounted in the lining of an induction furnace, the proposed refractory powder exhibited the same properties as that described in Example 1.

The thermophysical characteristics of the test pieces made of this powder were essentially similar to those described in Example 17. The porosity of the sintered powder mass was somewhat lower and constituted 14–16%, while the depth of the metallized layer of this mass decreased to 1.2–1.3 cm.

EXAMPLE 34

Under the same conditions as in Example 1 there was tested a refractory powder having the following composition (in wt.%):

| | |
|---|---|
| aluminum oxide | 40.2 |
| silicon dioxide | 59 |
| phosphoric anhydride | 0.8 |

During operation of the light guide assembly mounted in the lining of an induction furnace, the proposed refractory powder exhibited the same properties as that described in Example 1.

The thermophysical characteristics of the test pieces made from this refractory powder were essentially the same as those described in Example 16. The porosity of the sintered powder mass was lower and constituted from 11 to 12%. The depth of the metallized layer of said mass decreased to 0.8–0.9 cm.

EXAMPLE 35

The proposed refractory powder having the same composition as that in Example 1 was produced essentially in the same way as in said example. The rate of heating of the aluminum oxide powder and of the silicon dioxide powder during calcination was 8 K/min.

Such rate of heating of the aluminum oxide and silicon dioxide powders ruled out spontaneous blowouts and ensured a better removal of impurities.

The test results were essentially the same as those described in Example 1, except that the porosity of the sintered powder mass was lower and constituted from 15 to 16%, and the depth of the metallized layer decreased to 1.1–1.2 cm.

EXAMPLE 36

The proposed refractory powder having the same composition as that in Example 1 was produced essentially in the same way as in Example 35, except that after the aluminum oxide and silicon dioxide had been heated to the predetermined temperature, they were held at this temperature for 1.5 hours.

Such that treatment provided for better removal of the impurities, as compared with Example 35, and ensured the formation of a stable polymorphic modification of the aluminum oxide and provided for retaining the silicon dioxide in its initial modification. This ruled out cracking of the sintered refractory powder mass and the ingress of the melt onto the lateral surface of the light-transmitting member, and thereby the fracture thereof. Spontaneous blowouts during sintering of the refractory powder were also ruled out.

The test results were essentially the same as those described in Example 1. The porosity of the refractory mass was lower and constituted 14–15%. The depth of the metallized layer of said mass decreased to 0.9–1.0 cm.

EXAMPLE 37

A refractory powder of the same composition as that in Example 1 was produced essentially in the same manner as in Example 36, except that before heating, the aluminum oxide and silicon dioxide powders were subjected to etching by 60% hydrochloric acid and subsequently washing by water. As a result, the impurities contained in said powders transformed into readily soluble compounds which were removed by water.

The test results were essentially the same as those described in Example 1. The porosity of the sintered refractory powder mass was 13–14%, which is lower than in Example 1, and the depth of the metallized layer of said refractory mass decreased to 0.7–0.9 cm.

EXAMPLE 38

A refractory powder of the same composition as that in Example 1 was produced essentially in the same manner as in Example 37. The starting ingredients were preliminary comminuted to particle sizes of from 0.07 to 0.08 mm, due to which the surface of their interaction increased, and the sintering temperature thereof decreased by 50–60 K as a result.

The test results were essentially the same as those described in Example 1, but the porosity was lower and constituted 11–12%, and the depth of the metallized layer of said refractory mass decreased to 0.5–0.7 cm.

EXAMPLE 39

There were examined test piece prepared from a powder having the following composition (in wt.%):

| | |
|---|---|
| aluminum oxide | 54 |
| silicon dioxide | 45 |
| orthophosphoric acid | 1 |

The powder was produced in general as in Example 38. The orthophosphoric acid was used in the form of 7% aqueous solution.

While manufacturing a light guide assembly with the use of this powder the latter was readily compacted and did not tend to run out from the refractory tube when said device was being positioned into the lining of the metallurgical vessel.

EXAMPLE 40 (NEGATIVE)

A refractory powder of the same composition as in Example 1 was produced generally in a similar manner as in said Example. The aluminum oxide powder and the silicon dioxide powder were treated during calcination to a temperature below the recommended one, namely, to 500° C. and 300° C. respectively. As a result, the impurities present in the powder were not fully removed. The porosity of the sintered powder increased, while the depth of the metallized layer increased, and there was observed partial cracking thereof.

EXAMPLE 41 (NEGATIVE)

A refractory powder of the same composition as in Example 1 was produced generally in a similar manner as in said example. The aluminum oxide and silicon dioxide powders were heated during calcination to a temperature higher than recommended one, namely, to 1700° C. and 1500° C., due to which they were partially sintered and had therefore to be crushed again.

EXAMPLE 42

A refractory powder of the same composition as in Example 1 was produced generally as in Example 38. The particle size of the starting ingredients was below the recommended one and constituted 0.02 mm. As a result, while manufacturing a light guide assembly with the use of this powder the latter was difficult to compact and during operation of said assembly partially segregated and was washed out by the melt. This in some cases led to ingress of the melt to the lateral surface of the light-transmitting member.

EXAMPLE 43

A refractory powder of the same composition as in Example 1 was produced in a similar way as in Example 38. The particle size of the starting ingredients was 0.2 mm which is larger than recommended. In this case the porosity increased to a great extent, which resulted in a considerable increase of the depth of the metallized layer.

EXAMPLE 44

A refractory powder for use in a light guide assembly having a working temperature not higher than 870° C. (for instance, in the case of aluminum) was produced in the same manner as in Example 38, and had the same composition as in Example 1, with the powdered aluminum oxide being used in the form of polymorphic modification $\alpha$-$Al_2O_3$. The silicon dioxide was used in the form of its two polymorphic modifications: in the first case it was tridymite powder, in the second case— quartz powder.

During the period of 1000 hour operation of the light guide assembly at said temperature the powder containing the tridymite partially cracked, while the powder containing quartz was free from this defect.

EXAMPLE 45

A refractory powder produced as in Example 44 was tested in a light guide assembly working at the temperature of from 870° C. to 1470° C. (molten grey iron). This time cracking of the sintered powder was observed in the powder containing the quartz, while the powder containing the tridymite was free from this defect.

EXAMPLE 46

A refractory powder for use in a light guide assembly having the working temperature above 1470° C. (molten steel) was produced in the same way as in Example 38 and had the same composition as in Example 1. The aluminum oxide was in the form of $\alpha$-$Al_2O_3$. The silicon dioxide in one modification was used in the form of quartz powder, and in the other modification—in the form of a crystobalite powder.

During the period of 1000 hour operation of the light guide assembly at said temperature the powder mass containing the quartz partially cracked, while the powder including the crystobalite was free from cracks.

EXAMPLE 47

A refractory powder for use in a light guide assembly working at the temperature of 1470° C. (molten high-grade cast iron) was produced in the same way as in Example 38 and had the same composition as in Example 1. The aluminum oxide was used in the form of $\alpha$-$Al_2O_3$. The silicon dioxide in one modification was used in the form of a quartz powder, and in the other modification—in the form of a finely divided siliceous glass.

During the period of 1000 hour operation of said light guide assembly the refractory powder containing the quartz partially cracked, while the powder containing the siliceous glass was free from this defect.

EXAMPLE 48

A refractory powder for use in a light guide assembly working at the temperature of from 870° to 1470° C. (molten grey iron) was produced in a similar manner as in Example 38 and had the same composition as in Example. 1. The silicon dioxide was used in the form of a tridymite powder. The aluminum oxide was used in the form of its two polymorphic modifications. In the first case it was powdered $\alpha$-$Al_2O_3$, and in the second case $\alpha$-$Al_2O_3$.

During the period of 1000 hour operation of said light guide assembly the refractory powder containing $\alpha$-$Al_2O_3$ had some cracks, while the powder containing $\alpha$-$Al_2O_3$ was free from cracks at all. Furthermore, in the case of the powder containing $\alpha$-$Al_2O_3$ the depth of the metallized layer was greater than in the case of the powder containing $\alpha$-$Al_2O_3$, which worsened operation conditions for the light guide assembly.

While particular embodiments of the invention have been shown and described, various modifications thereof will be apparent to those skilled in the art and therefore it is not intended that the invention be limited to the disclosed embodiments or to the details thereof and the departures may be made therefrom within the spirit and scope of the invention as defined in the claims.

INDUSTRIAL APPLICABILITY

The invention may be useful in manufacturing light gude assemblies for use in smelting and casting of metals for measuring a temperature of molten ferrous and non-ferrous metals in induction furnaces, magnetic hydrodynamic pumps, cupolas, open-hearth furnaces and converters.

We claim:

1. A method for producing a refractory powder composition comprising the following components, in wt.%:
   aluminum oxide: 40–70
   silicon dioxide: 29–59
   sintering agent: 0.3–2.0
comprising heating the aluminum oxide powder and the silicon dioxide powder to elevated temperatures of from 1200° to 1400° and from 900° to 1200° C., respectively, then cooling to room temperature, and contacting with a sintering agent to provide a uniform mixture.

2. The method of claim 1, wherein the heating of the aluminum oxide and silicon dioxide occurs at the rate of from 7 to 10 K per min.

3. The method of claim 2, wherein after heating the aluminum oxide and silicon dioxide powders to said respective elevated temperatures, they are held at said respective temperatures for 1–2 hours.

4. The method as claimed in any one of claims 2 or 3, wherein before heating, the aluminum oxide and silicon dioxide are etched and then washed with water.

5. The method of claim 4, wherein the refractory powder components are preliminarily atomized to a particle size of from 0.05 to 0.1 mm.

6. The method as claimed in claim 5, wherein orthophosphoric acid is introduced as the sintering agent as a 3–20% aqueous solution.

7. The method as claimed in any one of claims 5 or 36, wherein the aluminum oxide is in the form of $\alpha$-$Al_2O_3$.

8. The method of claim 7, wherein the refractory powder has a working temperature not higher than 870° C. and the silicon oxide consists essentially of quartz powder.

9. The method of claim 7, wherein the refractory powder working temperature is from about 870° to 1470° C. and the silicon dioxide consists essentially of tridymite powder.

10. The method of claim 7, wherein the refractory powder working temperature is about 1470° C. and the silicon dioxide consists essentially of crystobalite powder.

11. The method of claim 7, wherein the refractory powder working temperature is about 1470° C. and the silicon dioxide consists essentially of siliceous glass.

12. The refractory powder composition formed in accordance with the method of claim 1.

13. The refractory powder composition of claim 12, having a particle size varying from about 0.05 to 0.1 mm.

14. The refractory powder composition of claim 12, wherein the aluminum oxide is $\alpha$-$Al_2O_3$.

15. The refractory powder composition of claim 12, wherein the sintering agent is selected from the group consisting of boric acid, boric oxide, phosphoric anhydride, and orthophosphoric acid.

16. The refractory powder composition of claim 12 comprising the following components, in wt.%:
aluminum oxide: 40–59
silicon dioxide: 40–59
sintering agent: 0.3–2.0.

17. The refractory powder composition of claim 16, comprising the following components in wt.%:
aluminum oxide: 51–56,
silicon dioxide: 42–47,
sintering agent: 0.6–1.5.

18. The refractory powder composition of claim 17, wherein the sintering agent is boric acid varying in amount from about 1–1.5 wt.%.

19. The refractory powder composition of claim 17, wherein the sintering agent is boron oxide varying in amount from about 0.6–0.8 wt.%.

20. The refractory powder composition of claim 17, wherein the sintering agent is orthophosphoric acid varying in amount from about 0.8–1.1 wt.%.

21. The refractory powder composition as claimed in claim 17, wherein the sintering agent is phosphoric anhydride varying in amount from about 0.6–0.8 wt.%.

* * * * *